United States Patent
Sawall et al.

(10) Patent No.: US 7,273,151 B2
(45) Date of Patent: *Sep. 25, 2007

(54) SIEVE BED FOR A SIFTING MACHINE

(75) Inventors: Kirk Sawall, Luck, WI (US); David H. Ditlefsen, Centuria, WI (US); Roland E. Küper, Bochum (DE)

(73) Assignee: Durex Products, Inc., Luck, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/677,457

(22) Filed: Oct. 2, 2003

(65) Prior Publication Data

US 2004/0074820 A1 Apr. 22, 2004

Related U.S. Application Data

(63) Continuation of application No. 09/936,718, filed on Feb. 13, 2002, now Pat. No. 6,634,505.

(30) Foreign Application Priority Data

Apr. 26, 1999 (DE) ................. 199 18 824

(51) Int. Cl.
B07B 1/46 (2006.01)
(52) U.S. Cl. .................... 209/405; 209/408
(58) Field of Classification Search ............. 209/319, 209/405, 407, 408, 412
See application file for complete search history.

(56) References Cited

U.S. PATENT DOCUMENTS 660,764 A 10/1900 Welch (Continued)

FOREIGN PATENT DOCUMENTS

AU 44810/85 1/1986

(Continued)

OTHER PUBLICATIONS

Isepren Modular System WS86, by Isemann America Inc., Lexington, KY, Jun. 1989.

(Continued)

*Primary Examiner*—Joseph C. Rodriguez
(74) *Attorney, Agent, or Firm*—North Oaks Patent Agency; Shawn B. Dempster

(57) ABSTRACT

The invention pertains to a sieve bed for a sifting machine, consisting of rectangular sieve elements (10), which are attached to a support frame (1) with their edges abutting each other, the support frame being provided with mushroom-shaped mounting pins (3), each of which is provided with a head which engages in an interlocking manner in corresponding recesses (11a and 11b) of the sieve elements (10).

To facilitate the assembly and disassembly of the sieve elements in a sieve bed of this type and to protect the connection from premature wear the invention proposes that the receptacle (11) for the head (4) of the mounting pin (3) be closed off at the top; that the receptacle (11) for the head (4) of the mounting pin (3) be provided at the bottom with an entrance opening for the head (4) of the mounting pin (3); and that the wall of the receptacle (11) be provided with an inward-projecting bead (12), which can be snapped under the head (4) of the mounting pin (3).

28 Claims, 4 Drawing Sheets

U.S. PATENT DOCUMENTS

| | | | |
|---|---|---|---|
| 954,452 A | 4/1910 | Mollen | |
| 965,447 A | 7/1910 | Forrest | |
| 966,578 A | 8/1910 | Murphy et al. | |
| 981,249 A | 1/1911 | Dietrick | |
| 1,279,630 A | 9/1918 | Yoder et al. | |
| 1,361,772 A | 12/1920 | Ouellette | |
| 1,857,490 A | 5/1932 | Barrett | |
| 1,870,926 A | 8/1932 | Sawyer | |
| 2,010,256 A | 8/1935 | Cole | |
| 2,046,298 A | 6/1936 | Woods | |
| 2,118,800 A | 5/1938 | Smith | |
| 2,255,939 A | 9/1941 | Overstrom et al. | |
| 2,360,933 A | 10/1944 | Bunker | |
| 2,487,914 A | 11/1949 | Woolcott et al. | |
| 2,703,649 A | 3/1955 | Cheyette | |
| 3,251,103 A | 5/1966 | Saut | |
| 3,390,771 A | 7/1968 | Wehner | |
| 3,446,692 A | 5/1969 | Tumbull | |
| 3,456,795 A | 7/1969 | Svensson et al. | |
| 3,605,166 A | 9/1971 | Chen | |
| 3,664,503 A | 5/1972 | Felden | |
| 3,718,963 A | 3/1973 | Hawkins et al. | |
| 3,733,655 A | 5/1973 | Kolibar | |
| 3,795,311 A | 3/1974 | Martin | |
| 3,811,570 A | 5/1974 | Holding et al. | |
| 3,865,720 A | 2/1975 | Wilson | |
| 3,893,208 A | 7/1975 | Yuda | |
| 3,905,897 A | 9/1975 | Jaconson | |
| 3,943,054 A | 3/1976 | Simonson | |
| 3,970,549 A | 7/1976 | Ennis et al. | |
| 3,970,550 A | 7/1976 | Fry et al. | |
| 3,980,555 A | 9/1976 | Freissle | |
| 4,120,784 A | 10/1978 | Hasall | |
| 4,120,785 A | 10/1978 | Kanamori et al. | |
| 4,141,821 A | 2/1979 | Wolff | |
| 4,167,478 A | 9/1979 | Salete | |
| 4,219,161 A | 8/1980 | Freissle | |
| 4,219,412 A | 8/1980 | Hassall | |
| 4,222,865 A | 9/1980 | Valeri et al. | |
| 4,247,007 A | 1/1981 | Kai | |
| 4,265,742 A | 5/1981 | Bucker et al. | |
| 4,278,535 A | 7/1981 | Wolff | |
| 4,339,085 A | 7/1982 | Williams | |
| 4,347,129 A | 8/1982 | Rutherford | |
| 4,361,614 A | 11/1982 | Moffitt | |
| 4,383,919 A | 5/1983 | Schmidt | |
| 4,409,099 A | 10/1983 | Wolff | |
| 4,473,466 A | 9/1984 | Schmidt et al. | |
| 4,478,545 A * | 10/1984 | Mizusawa et al. | 411/80.1 |
| 4,510,202 A | 4/1985 | Hatchard | |
| 4,585,179 A | 4/1986 | Tsuji et al. | |
| 4,661,245 A | 4/1987 | Rutherford et al. | |
| 4,667,886 A | 5/1987 | Unland et al. | |
| 4,670,136 A | 6/1987 | Schmidt et al. | |
| 4,674,251 A | 6/1987 | Wolff | |
| 4,716,694 A | 1/1988 | Freissle | |
| 4,743,740 A | 5/1988 | Adee | |
| 4,757,664 A | 7/1988 | Freissle | |
| 4,761,926 A | 8/1988 | Rea et al. | |
| 4,762,610 A | 8/1988 | Freissle | |
| 4,763,845 A | 8/1988 | Guggenheimer et al. | |
| 4,819,809 A | 4/1989 | Derrick | |
| D302,019 S | 7/1989 | Dehlen | |
| 4,871,288 A | 10/1989 | Schmidt et al. | |
| 4,882,044 A | 11/1989 | Freissle | |
| 4,892,767 A | 1/1990 | Freissle | |
| 4,903,903 A | 2/1990 | Benen | |
| 4,909,929 A | 3/1990 | Tabor | |
| 4,928,890 A | 5/1990 | Swisher | |
| 4,960,510 A | 10/1990 | Wolff | |
| 5,041,214 A | 8/1991 | Gero et al. | |
| 5,045,184 A | 9/1991 | Arkles | |
| 5,049,262 A | 9/1991 | Galton et al. | |
| 5,085,324 A | 2/1992 | Dehlen | |
| 5,085,545 A * | 2/1992 | Takahashi | 411/45 |
| 5,181,663 A | 1/1993 | Dorscht et al. | |
| 5,185,980 A | 2/1993 | Rydberg et al. | |
| 5,197,587 A | 3/1993 | Malmberg | |
| 5,213,217 A | 5/1993 | Galton et al. | |
| 5,267,246 A | 11/1993 | Huang et al. | |
| 5,294,065 A | 3/1994 | Harms et al. | |
| 5,361,911 A | 11/1994 | Waites, Sr. et al. | |
| 5,363,970 A | 11/1994 | Freissle | |
| 5,372,261 A | 12/1994 | Galton et al. | |
| 5,377,846 A | 1/1995 | Askew | |
| 5,385,242 A | 1/1995 | Freissle | |
| 5,445,330 A | 8/1995 | Rashwan et al. | |
| 5,462,175 A | 10/1995 | Bokor | |
| 5,464,101 A | 11/1995 | Freissle | |
| 5,476,227 A | 12/1995 | Tamura et al. | |
| 5,614,094 A | 3/1997 | Deister | |
| 5,664,685 A | 9/1997 | Freissle | |
| 5,667,681 A | 9/1997 | Magrecki et al. | |
| 5,699,918 A | 12/1997 | Dunn | |
| 5,720,879 A | 2/1998 | Cope | |
| 5,816,413 A | 10/1998 | Boccabella et al. | |
| 5,829,599 A * | 11/1998 | Woodgate | 209/399 |
| 5,839,490 A | 11/1998 | Kiedaisch et al. | |
| 5,938,042 A | 8/1999 | Freissle | |
| 6,089,805 A * | 7/2000 | Salmon | 411/45 |
| 6,260,711 B1 | 7/2001 | Woodgate | |
| 6,267,246 B1 | 7/2001 | Russell et al. | |
| 6,634,505 B1 | 10/2003 | Sawall et al. | |
| 2003/0012833 A1 | 1/2003 | Freissle et al. | |
| 2003/0038060 A1 | 2/2003 | Freissle et al. | |

FOREIGN PATENT DOCUMENTS

| | | |
|---|---|---|
| CA | 1001118 | 12/1976 |
| CA | 1317252 | 5/1993 |
| CA | 1323602 | 10/1993 |
| CA | 2181321 | 2/1997 |
| CA | 2391857 | 12/2002 |
| CA | 2397050 | 2/2003 |
| DE | 1155963 | 10/1963 |
| DE | 2417483 | 10/1974 |
| DE | 2754374 A1 | 6/1979 |
| DE | 2924571 A1 | 1/1981 |
| DE | 3123405 | 4/1982 |
| DE | 538559 | 8/1984 |
| DE | 3606854 | 9/1987 |
| DE | 3724246 | 2/1989 |
| EP | 167999 | 1/1986 |
| EP | 202863 | 11/1986 |
| EP | 0710509 B1 | 1/1999 |
| FR | 1308241 | 9/1962 |
| FR | 1519155 | 3/1968 |
| FR | 2574007 | 6/1986 |
| GB | 16928 | 8/1891 |
| GB | 157431 | 7/1921 |
| GB | 500378 | 2/1939 |
| GB | 705389 | 3/1954 |
| GB | 736190 | 9/1955 |
| GB | 1343431 | 1/1974 |
| MX | 171519 | 3/1993 |
| WO | WO 84/02290 | 6/1984 |
| WO | WO 89/08509 | 9/1989 |
| WO | PCU/US89/05202 | 5/1990 |
| WO | WO 96/11070 | 4/1996 |
| WO | WO 97/28906 | 8/1997 |
| WO | WO 98/33604 | 8/1998 |
| WO | WO 98/47633 | 10/1998 |
| WO | PCT/US00/11162 | 11/2000 |
| WO | PCT/ZA02/00201 | 6/2003 |

ZA        74/5092        8/1975

OTHER PUBLICATIONS

Partial English translarion of earlier-cited German Patent Application No. 19918824.6.

Partial English translation of earlier-cited German Patent No. 1,155,963.

Partial English translation of earlier-cited German Patent No. 3,606,854.

Partial English translation of earlier-cited European Patent No. 167,999.

\* cited by examiner

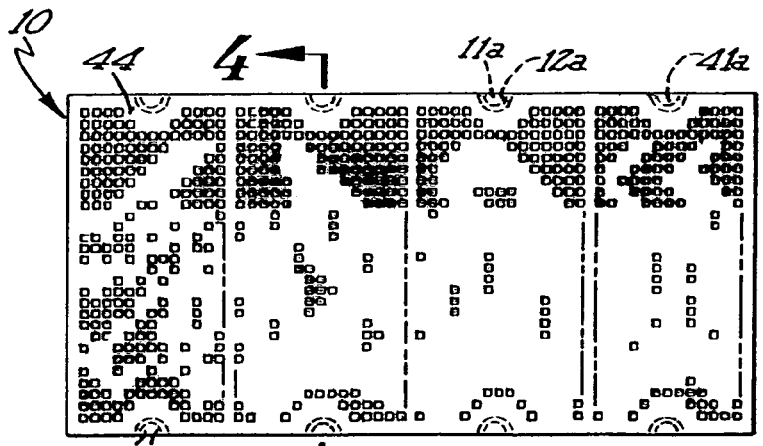
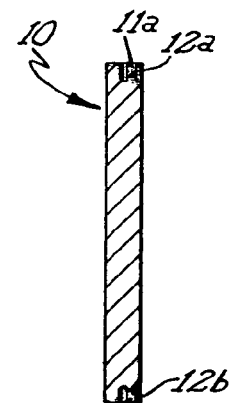
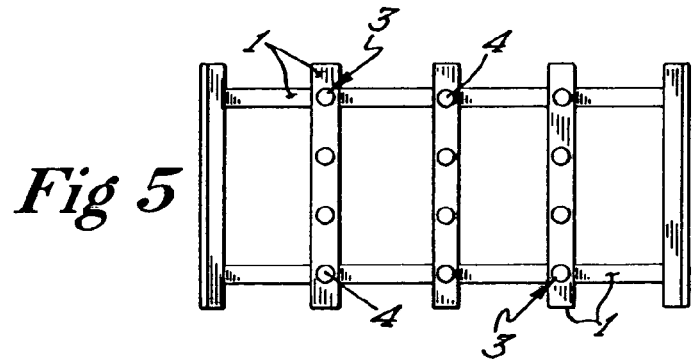
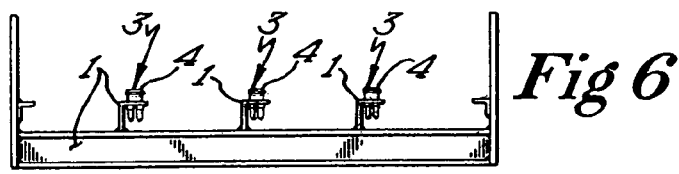
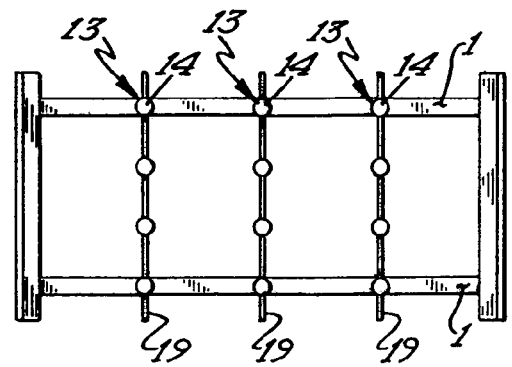
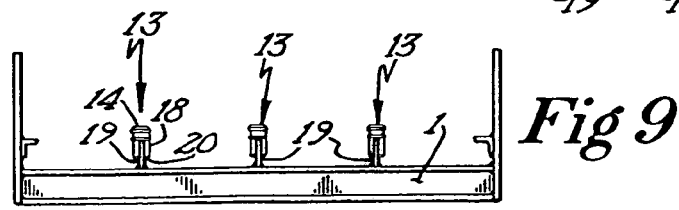

SIEVE BED FOR A SIFTING MACHINE

CROSS REFERENCES

This application is a continuation of U.S. patent application Ser. No. 09/936,718 filed on Feb. 13, 2002, now U.S. Pat. No. 6,634,505 which is itself based upon PCT patent application no. WO 00/064599 A3 filed on Apr. 26, 2000 that was itself based upon German patent application no. 199 18 824.6 which was filed on Apr. 26, 1999.

BACKGROUND OF THE INVENTION

The invention pertains to an improved sieve bed for a sifting machine. More particularly, the invention relates to an improved mounting pin that allows for a maximum useful surface area for the sieve bed and which also securely mounts a plurality of sieve elements on a support frame of the sieve bed.

BRIEF DESCRIPTION OF THE RELATED ART

Various structures for screening or sifting particulate materials are known in the art. In general, a screening or sifting machine consists of a plurality of sieve elements (also referred to as screening panels and screen modules, among others) that are attached to a support frame with their edges abutting one another to create a contiguous sifting surface. Existing sifting machines can be loosely divided into those devices having sieve elements that are secured to an underlying support frame by means of projections which extend downwardly from the sieve elements themselves, and those devices which are secured to an underlying support frame by means of projections which extend upwardly from the support frame to mate with complimentary cavities formed in the sieve elements.

It is known that the mounting pins can be designed as integral parts of the sieve elements. In one case, half pins are molded onto the opposing edges of adjacent sieve elements; these half-pins are designed to work together to form a whole pin. The half-pins can be driven or snapped jointly into a mounting hole in the support frame. A sieve element such as this suffers from the disadvantage that the mounting pins must necessarily consist of the same material as the sieve elements; this can detract from the quality of the attachment if the sieve elements consist of a relatively soft material. In addition, it is also more difficult in particular to remove the sieve elements, because, each time the elements are removed, the relatively long half-pins must be pulled out of their mounting holes. Another disadvantage of the sieve bed of this type consists in that, after the sieve elements have become worn out, the mounting pins also must be replaced along with the sieve elements. They cannot therefore simply remain on the support frame.

A specific example of the former type of sieve bed is disclosed in U.S. Pat. No. 5,938,042 to Freissle et al. The Freissle patent discloses a support frame made of up of a plurality of frame components in which a pair of complimentary elongate members, each having a plurality of cavity defining formations, are secured to one another so as to form a unitary frame component having a plurality of cavities for receiving respective socket elements therein. When arranged side by side upon a sub-frame comprising a plurality of support beams, the frame components form a support frame to which a plurality of screening panels may be secured. Protrusions depending from the under surface of the screening panels are inserted into socket elements retained within the cavities of the respective frame components. Some of the disadvantages of this design include the fact that the frame components comprise too many constituent parts, require numerous and expensive manufacturing steps, require a higher degree of maintenance, and exert a hold down force upon the screening elements that is limited by the strength of the elastic material from which the protrusions depending from the undersurface of the screening panels are made.

A sieve bed of the latter type described above is known from, for example, DE-GM 78-11,183. In this known sieve bed, the mounting pins are driven from above into the receptacles formed by two adjacent sieve elements. The pins are thus able to pass into appropriately located mounting holes in the support frame and are then spread and tensioned by an expanding mandrel, which can be driven into the mounting pin.

This design of a sieve bed suffers from several disadvantages. A first significant disadvantage is that the receptacle for the mounting pin must be open at the top; this means that it is exposed to the wearing action of the highly abrasive material being sifted. In addition, there is the danger that fines from the material being sifted can get into the attachment area, where they can interfere with the removal of the sieve bed. Finally, both the installation and removal of the previously known sieve bed are relatively cumbersome because the mounting pins must be completely removed and then reinstalled each time the sieve elements are replaced.

Another example of the latter type of sifting machine is disclosed in U.S. Pat. No. 5,049,262 issued to Galton et al. The Galton device consists of a deck frame made up of a series of rigid elongate members spaced apart in parallel relationship and interconnected at regular intervals by cross members. The elongate frame members each include a series of mounting apertures that are spaced apart along each member and oriented normal to the plane of the elongate member for positioning and removably connecting screening modules to the frame. Lock pins are inserted into the mounting apertures so that a top portion of the lock pin extends upwardly from the elongate frame members. Recesses in the edges of the respective screening modules receive the upper portion of these lock pins therein for the purpose of securing the screen modules to the frame. The recesses in at least one embodiment of the screening modules of the Galton patent are constructed and arranged so that the upper portion of the lock pins are wholly encompassed within and between respective screening modules placed over a lock pin. In this embodiment, no portion of the lock pin extends to or above the upper surface of the screening modules.

Some of the disadvantages that this design suffers from include the fact that given that the lock pins described in the Galton patent must be received within an aperture formed through a substantially horizontal surface of the elongate frame members, the frame members are constrained to be at least as wide the widest portion of the lock pins themselves. The relatively large surface area of the elongate frame members reduces the useful area of the screening modules in the assembled sifting machine and thereby decreases the magnitude of the material throughput of the sifting machine. What is more, because the lock pins of the Galton patent must be made from an elastic material in order to insert the lock pins into the mounting apertures in the elongate frame members, the hold down force that the lock pins may exert upon the screening modules is necessarily limited, thereby increasing the likelihood that the screening modules will become dislodged under heavy loading conditions.

In general, wherein elastic protrusions, projections, or lock pins are utilized to secure a sieve element, screening panel, or screening module to a support frame of a sifting machine, the hold down force that may be asserted in these screening elements is necessarily limited. And, as the screening elements themselves are relatively elastic, impact forces imparted thereto by materials being dropped or otherwise placed on the sifting machine are transmitted directly to the mechanisms which secure the screening panels to the support frame of the sifting machine. These impact forces can readily dislodge screening elements not securely attached to the support frame, thereby requiring a user to suspend operation of the sieve machine while the screen panel is replaced. Where a screen panel becomes dislodged during operation, the particulate matter being sifted may also cause undue wear on the screen panels and on the support frame.

In order to reduce the likelihood of a panel becoming dislodged during operation, relatively thin and elastic screening panels have been used. While these thinner screening panels would be subject to relatively higher deflections, their elastic nature would reduce the magnitude of the forces imparted to the mechanisms used to secure the panels to the sub-frame. The use of relatively thin screening panels has in turn resulted in shorter useful lives for the screening elements themselves because the abrasive nature of the materials being screened or sifted tends to wear out the relatively thinner panels at an unacceptably fast rate.

Prior art sifting machines also often fail to maximize the useful area of the screening elements or modules. The term "useful area" is used herein to indicate the total area of the screening surface that may pass therethrough particulate material that is being sifted. Generally speaking, a larger useful area equates with a larger total throughput of particulate materials. This in turn results in higher efficiencies and a greater return on a user's investment. Unfortunately, prior art devices that make an effort to maximize the useful area of the screening surface tend to become rather complicated and comprise a great many parts that may be susceptible to undue wear and tear themselves.

OBJECTIVES OF THE INVENTION

Accordingly, it is an objective of the present invention to provide a retaining mechanism for retaining a plurality of sieve elements on a support frame that maximizes the useful area of a sieve bed and provides a strong point of attachment for the sieve elements. The present invention also provides for a substantially rigid retaining mechanism that is resistant to wear and easily installed and replaced if necessary. Another objective of the present invention is to provide a retaining mechanism that increases the strength of the connection between the sub-frame of the sieve bed and the sieve elements and that permits the relative strength and thickness of a sieve element to be increased above what is normally considered useful in the prior art. It is a final objective of the present invention to provide a sieve element that will prevent fines and other particulate material from gaining access to the retaining mechanism used to secure the sieve elements to a support frame.

These and other objectives and advantages of the invention will appear more fully from the following description, made in conjunction with the accompanying drawings wherein like reference characters refer to the same or similar parts throughout the several views.

SUMMARY OF THE INVENTION

In the sieve bed according to the invention, the receptacle for the head of the mounting pin is closed off at the top, so that the head of the mounting pin cannot be worn down. Instead, the head is in a protected state underneath the top surface of the sieve elements, the edges of which are arranged in abutting fashion. Because the receptacle for the mounting pin has an opening at the bottom for the head of the mounting pin, the sieve elements, which consist of elastic material, can be easily pressed down from above onto the heads. Thus the bead on the wall of the receptacle will snap into the space underneath the head of the mounting pin and thus fix the sieve element in place on the mounting pin and the support frame.

Because of the way in which the sieve elements and mounting pins are designed, as explained above, it is possible to fix the sieve elements in place by pressing down on them from above and then by simply hitting them with a hammer above the mounting pins. For removal, a suitable tool is inserted into the joint between two adjacent sieve elements, and then the sieve element is pried off the heads of the mounting pins under elastic deformation of the edge of the element. The installation and removal of the sieve elements is therefore as simple as could be imagined; even better, the mounting pins can remain on the frame which is an especially advantageous feature To facilitate the insertion and snap-in engagement of the mounting pin in its mounting hole, it is also provided that the top edge of the head of the mounting pin is rounded or beveled, An advantageous embodiment of the sieve bed according to the invention provides that the mounting pins are made of a plastic with elastic properties and that the pins can be inserted into and held in place in the mounting holes of the support frame. These mounting pins of elastic plastic can themselves be easily attached to the support frame and removed from it again if it is ever necessary to replace one of them.

When mounting pins of plastic are used, it is advisable to provide a support shoulder a certain distance below the head of the mounting pin, this shoulder resting from above on the edge of the mounting hole in the support frame. This support shoulder ensures that a mounting pin which has been snapped into the mounting hole in the support frame is always at the correct height with respect to the support frame.

To fix the mounting pin of plastic in place in the support frame, it is advisable for each mounting pin to have a bulge a certain distance underneath the support shoulder, the diameter of this bulge area being greater than the diameter of the mounting hole in the support frame. This bulge can thus be snapped into the space under the edge of the mounting hole this prevents the mounting pin from coming loose from the support frame during the installation of the sieve elements To avoid excessive forcing or damage to the outer contour of the mounting pin, the plastic-mounting pin is advisably provided with a slot, which extends up from the bottom all the way into the area of the bulge. As a result, the pin can be compressed in the radial direction To facilitate the installation of the plastic mounting pins, each mounting pin has an annular collar between its bulge and the bottom end, the diameter of this collar being slightly greater than the diameter of the mounting hole in the support frame. Thanks to this annular collar, the plastic mounting pin can be inserted by hand and temporarily held in place in the mounting hole of the support frame. This is done by compressing the slotted area of the mounting pin radially by hand and by introducing the pin into the mounting in this compressed state. Thus held in place temporarily, the mounting pin stays in position until it is driven into the mounting hole by the effective use of a hammer and thus snapped into its fastening position behind the bulge.

Finally, the bottom end of the plastic mounting pin is rounded or beveled to make it easier for the pin to be installed.

The plastic mounting pins can also be attached to the support frame in a different way. For example, it is possible for the mounting pin to have an axially running longitudinal hole extending through it into which an expanding mandrel can be driven to fix the mounting pin in the mounting hole of the support frame. When this method of attachment is used, the outer contour of the mounting pin in the area underneath the support shoulder can be that of a simple cylinder.

In another embodiment of the sieve bed according to the invention, the mounting pins consist of steel and are welded to the support frame. In this case, the mounting pins are advisably provided with a slot at the bottom, by means of which they can be mounted on vertical webs of the support frame before being welded to it. These slots make it extremely easy for the mounting pins to be welded in the correct position to the support frame. The use of vertical webs on the support frame is an extremely advantageous way of increasing the active sieve area around the edges of the sieve elements. This is because the vertical webs of the support frame are much narrower than the frame parts with the mounting holes provided in accordance with the preceding design.

One embodiment of a support frame for a sieve bed comprises a plurality of elongate ribs each having a thickness that is substantially smaller than its height. These thin ribs are arranged side-by-side upon a sub-frame such that the upper edges of the ribs are substantially co-planar. Each rib has a plurality of substantially rigid mounting pins secured to its upper edge for securing an array of sieve elements to the support frame in abutting juxtaposition. The mounting pins are typically spaced along the upper edge of the ribs at between 5 and 14 inches on center.

The mounting pins of this embodiment have a frustoconical upper surface that, when received within a receptacle formed by a pair of cooperative apertures formed in adjacent edges of abutting sieve elements, secure the sieve elements to the support frame. The mounting pins may be fabricated from a ferrous alloy, and if so, may be secured to the ribs by welding. Where the mounting pin is welded to the rib, it is preferred to only weld the distal end of the stem of the mounting pin to the rib.

The heads of the mounting pins are mushroom shaped and have an upper surface that is preferably frustoconical and an under surface that is preferably substantially flat. A stem is secured to and extends away from the under surface of the head in a substantially perpendicular relationship to the head. The stem has a slot formed in its distal end that extends toward the head. This slot is constructed and arranged to receive therein the upper edge of the rib on which it is mounted and aids in locating the mounting pin on the rib. To this end, it is preferred that the slot formed in the stem of the mounting pin terminate in a substantially flat shoulder that is in a planar perpendicular orientation with respect to the axis of symmetry of the stem of the mounting pin.

The upper surface of the head of the mounting pin is preferably angled outward and downward at approximately a 45° angle from a plane perpendicular to an axis of symmetry of the head of the mounting pin. And while the undersurface of the head is preferably perpendicular to the stem, the undersurface may angle away from this orientation by between +5° and −5°.

Another embodiment of the mounting pin is stamped from a metal plate and comprises a hollow cylindrical body with an upper end and a lower end. The lower end of the body has an aperture formed therethrough and the upper end of the body has depending downwardly therefrom a substantially frustoconical surface. This type of mounting pin may be secured to the upper edge of a rib by welding the mounting pin to the rib through the aperture formed in the cylindrical body of the pin.

Another aspect of the present invention is an improved sieve element that has a bead formed along its lateral edges such that when the sieve element is placed in abutting juxtaposition with one or more additional sieve elements, the beads on the abutting edges of the respective sieve elements contact one another to form a seal therebetween. This seal prevents particulate materials from passing between the sieve elements where they might abrade the mounting pins.

DESCRIPTION OF THE DRAWINGS

FIGS. 3 and 4 show a plan view and a cross section, respectively, of a sieve element of plastic;

FIGS. 5 and 6 show a plan view and a cross section, respectively, of a support frame with inserted mounting pins of plastic;

FIGS. 8 and 9 show a support frame with welded-on mounting pins of steel;

DETAILED DESCRIPTION

Although the disclosure hereof is detailed and exact to enable those skilled in the art to practice the invention, the physical embodiments herein disclosed merely exemplify the invention, which may be embodied in other specific structure. While a preferred embodiment has been described, the details may be changed without departing from the invention, which is defined by the claims.

Figure 1:
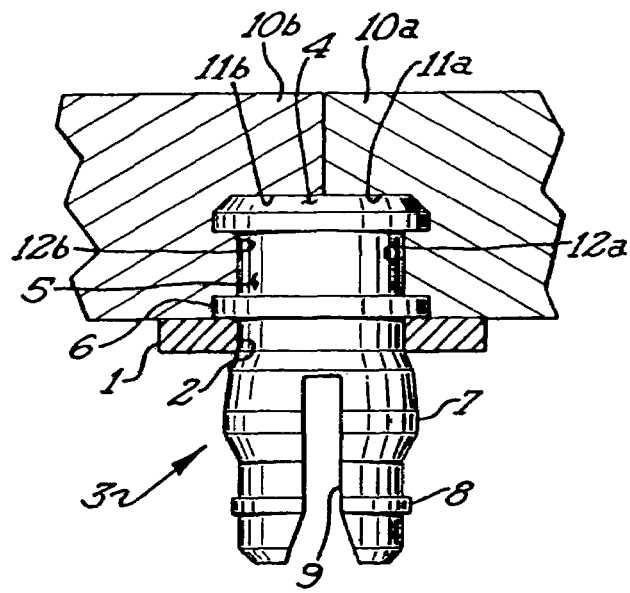
FIG. 1 shows a vertical cross section through a sieve bed according to the invention in the area of a mounting pin.

FIG. 1 shows only a part of the support frame, which is identified overall by reference number 1 The support frame 1 has a plurality of mounting holes 2, only one of which can be seen in FIG. 1. A mounting pin 3, fabricated out of an elastic plastic such as polyurethane is inserted into each of these mounting holes 2 and press-fit tightly in place. Mounting pin 3 is provided at the top with a head 4, the outside edge of which is rounded or beveled at the top Underneath the head 4, the mounting pin 3 is provided with a circumferential groove 5. Underneath the groove 5 there is a ring-shaped support shoulder 6, the diameter of which is considerably greater than the diameter of the mounting hole 2 in the support frame 1 and which rests from above on the edge of this mounting hole 2

Underneath the support shoulder 6, the diameter of the mounting pin 3 is slightly larger than that of the mounting hole 2, so that at this point a' tight press-fit of the elastically deformable mounting pin 3 in the mounting hole 2 is achieved.

The mounting pin 3, furthermore, is provided with a bulge 7 a certain' distance below the support shoulder 6. This bulge tapers in the upward direction toward support shoulder 6 at a shallow angle and in the downward direction at a steep angle. The diameter of this bulge 7 is significantly greater than the diameter of the mounting hole 2 in the support frame 1.

An annular collar 8, the diameter of which is greater than the diameter, of the mounting hole 2 in the support frame 1, is provided between the bulge 7 and the bottom end of the mounting pin 3. The outer circumference of the bottom end of the mounting pin 3 is rounded or beveled just like the head 4. Finally, the lower section of the mounting pin 3 is provided with a vertical slot 9, which extends up from the bottom, ending slightly beyond the area of, the bulge 7.

The effect of slot 9 is to allow the lower section of the mounting pin 3 to be easily squeezed radially by hand upon insertion into the mounting hole 2 of the support frame 1, so that the annular collar 8 can be passed through the mounting hole 2. The mounting pin 3 is thus temporarily held in place in the, mounting hole 2, then a strong blow from above with a hammer can drive the mounting pin 3 all the way into the mounting hole 2. As part of this process, the bulge 7, in cooperation with the slot 9, allows the mounting pin 3 to snap into the mounting hole of the support frame 1.

The head 4 of the mounting pin 3 serves to hold the two abutting sieve' elements 10a and 10b in place. For this purpose, these sieve elements 10 are provided on their abutting edges with corresponding recesses 11a and 11b, which work together to form a receptacle 11, which corresponds to the shape of the head 4 of the mounting pin 3, and in which the head 4 of the mounting pin, 3 engages in an interlocking manner. This receptacle 11 is closed off at the top, whereas it has an entrance opening in its bottom for the head 4 of the mounting pin 3, the diameter of this opening being smaller than that of the head 4. This entrance opening is formed by a circumferential bead 12, which consists of the two bead sections 12a and 12b projecting inward from the wall, of the receptacle 11. The bead snaps into the groove 5 in the mounting pin 3 under the head 4.

The sieve elements are assembled by laying them with their edges abutting each other on the support frame 1 in such a way that the recesses 11a and 11b, come to lie above the heads of the previously installed mounting pins 3. Then the sieve elements 10 are fixed in place by hitting them with a hammer above the heads 4 of the mounting pins 3. As a result, the elastic material of which the heads 4 of the mounting pins 3 are made is elastically deformed; this allows the heads to enter the receptacles 11, where they snap in place, behind the bead 12

For disassembly, a suitable tool is inserted into the joint between two, abutting sieve elements 10. With the help of this tool, the sieve elements 10 are then pried off the mounting heads 4 of the mounting pins 3 under elastic deformation of their material.

Both assembly and disassembly are therefore as simple as could be imagined and can be accomplished with very simple tools.

Figure 2:
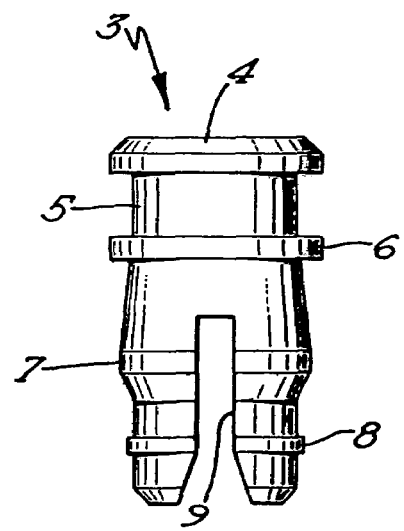
FIG. 2 shows a side view of a mounting pin of plastic.

FIG. 2 shows a mounting pin 3 by itself with all of its parts as, described above.

As can be derived from FIGS. 3 and 4, the sieve elements 10 are designed as rectangular plates, which are provided over their flat expanses with a plurality of sieve openings. Along their longitudinal edges, they are provided with the above-explained recesses 11a and 11b, which work together with the corresponding recesses 11a and 11b of adjacent sieve elements to form the receptacles 11.

FIGS. 5 and 6 show a plan view and a cross section, respectively, of the support frame 1 with the mounting pins 2 attached to it in the manner described above.

Figure 7:
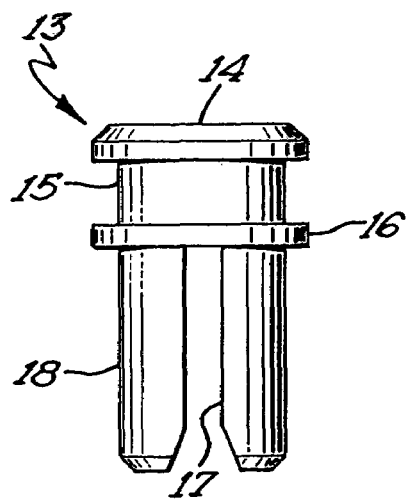
FIG. 7 shows a side view of a mounting pin of steel.

FIG. 7 shows an alternative embodiment of the mounting pin, which is made of steel; this pin is identified by the reference number 13. The mounting pin 13 also has a head 14, a groove 15 underneath the head, and a support shoulder 16 underneath the groove To this extent, mounting pin 13 is the same as mounting pin 3 described above. Underneath the support shoulder 16, however, mounting pin 13 is designed as a cylinder 18 with a slot 17 over its entire length. This cylinder can be welded to the support frame 2.

The way in which the mounting pins 13 can be welded to the support frame 1 is illustrated in FIGS. 8 and 9. That is, the slot in the cylindrical section 18 of the mounting pin 13 is placed from above onto vertical web 19 of the support frame 1 and fixed in place there by welds 20.

Figure 10:
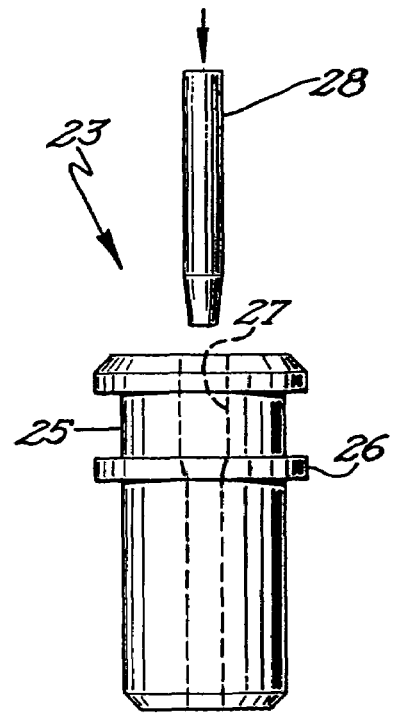
FIG. 10 shows a mounting pin and the method used to fix it in place on the support frame in accordance with a modified design; and, FIG. 11 shows a mounting pin seated upon a vertical rib member of a support frame.

In the exemplary embodiment according to FIG. 10, the mounting pin is identified by reference number 23. This mounting pin 23 also consists of an elastic plastic and has a head 24, a groove 25 underneath the head, and a support shoulder 26. To this extent, mounting pin 23 is the same as mounting pins 3 and 13 described above.

The mounting pin 23, however, is designed as a cylinder underneath the support shoulder 26, and has a longitudinal hole 27 extending all the way through it; this hole tapers slightly underneath the support shoulder 26. An expanding mandrel 28 can be driven from above into this tapered longitudinal hole 27; the mandrel thus spreads the mounting pin 23 apart underneath the support shoulder 26 in such a way that it is held by tension in the mounting hole of the support frame 1. If desired, the mounting pin 23 can also be provided with a slot underneath the support shoulder 26 to make it easier for the pin to expand.

Figure 11:
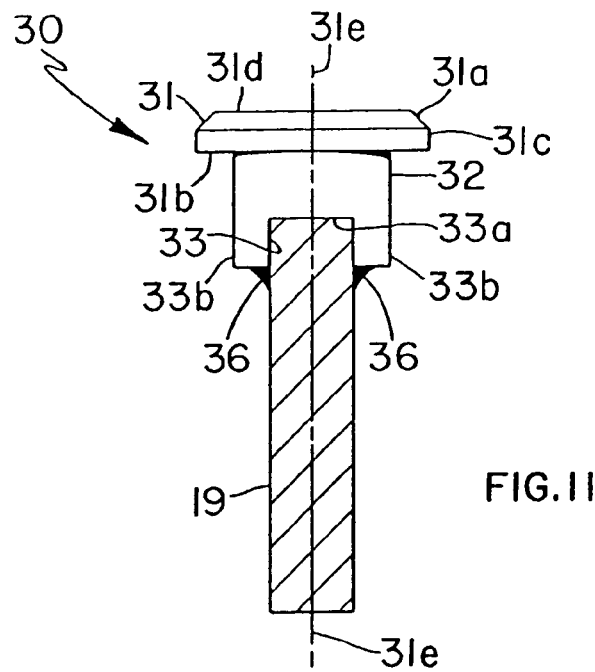

An alternate embodiment of the mounting pin 13 of FIG. 7 is illustrated in FIG. 11. The mounting pin of this alternative embodiment is identified by the reference numeral 30. Mounting pin 30 comprises a head 31 that is secured to a stem 32 having a slot 33 formed in its distal end.

The head 31 of the mounting pin 30 has a frustoconical upper surface 31A, which forms an angle between 45° and 60° from the axis of symmetry 31E of the head 31. Preferably the top 31D of the head 31 is flat but may also be hemispherical or may be omitted, resulting in a conical upper surface 31A. The undersurface 31B of head 31 is preferably flat, i.e. perpendicular to the axis of symmetry 31E but may also be frustoconical in shape, angling away from perpendicular to the axis of symmetry 31E by approximately 5° in either direction. While the surfaces 31A and 31B of head 31 may be formed immediately adjacent one another, thereby forming a relatively sharp edge, it is preferred to interpose a cylindrical section 31C between surfaces 31A and 31B. Section 31C may be flat, i.e. cylindrical, or it may be radiused to form a gentle transition between head surfaces 31A and 31B. The configuration of the head 31 of mounting pin 30 is advantageous in that the amount of force necessary to insert the head 31 of the mounting pin 30 into the receptacle 41 formed between the sieve elements 40 is relatively low whereas the amount of force required remove the sieve elements 40 from the support frame 1 is substantially higher and results in a stronger bond between the support frame 1 and the sieve element 40. This stronger bond in turn reduces the likelihood that a sieve element 40 will unnecessarily become dislodged from the support frame 1.

The mounting pin 30 is preferably fashioned of steel or another alloy that can easily be secured, as by welding, to the vertical ribs 19 that form the support frame 1 of this embodiment. However, it is contemplated that other materials may be used in fashioning the head 31 of the mounting pin 30 so long as the head 31 remains substantially rigid. By way of example, the head 31 of the mounting pin 30 may be coated or clad with a layer of a ceramic material, a plastic material such as Teflon™, or even plated. Alternatively, the head 31 may be fashioned completely from a ceramic material and secured to the stem 32. Preferably, the head 31 will be case hardened, as by carburizing, to increase the strength and abrasion resisting capabilities of the head 31.

The stem 32 extends away from the head 31, preferably in a normal relationship to the head 31. The stem 31 is narrower in cross-section than the head 31 and has a slot 33 formed in the distal end of the stem 32 opposite the head 31 of the mounting pin 30. The slot 33 extends from the distal end of the stem 32 along the stem 32 in the direction of the head 31, thereby forming a pair of legs 33b. The slot 33 terminates in a shoulder 33a that is preferably formed in a perpendicular planar relationship with the axis of symmetry 31C of the mounting pin 30. The slot 33 is sized to receive therein the upper edge of a vertical rib 19, with the legs of the stem 32 extending down each side of the rib 19. The flat shoulder 33a acts to properly orient the head 31 of the mounting pin above the upper edge of the vertical rib 19. The mounting pin 30 is secured to the rib 19 by welding only the distal ends of the legs 33b to the respective sides of the rib 19, though the welds could extend up the legs 33b if need be. The stem 32 and slot 33 are to be sufficiently long that the weld 36 will be spaced apart from the upper edge of the vertical rib 19 to an extent that will prevent the welds from deforming the upper edge of the rib 19 or damaging the hardened head 31 of the mounting pin 30. Sizing the stem 32 and slot 33 relatively long also advantageously allows a damaged mounting pin 30 to be cut or ground off of the rib 19 and replaced without damaging or deforming the upper surface of the rib 19.

It is preferable to form the mounting pin 30 as a unitary structure of a suitable steel. This allows the mounting pin 30 to be welded to a support frame, or alternatively, to be bolted or otherwise connected to the support frame. As indicated above, it is also contemplated that the head 31 and stem 32 may be fabricated from different materials. For example, the stem may be fabricated from steel whereas the head 31 is a ceramic material joined to the stem 32 by an adhesive or by a mechanical fastener. Alternatively, the head 31 may be of steel and the stem 32 may be fashioned from a material such as a ceramic.

Referring again to FIG. 11, it can be seen that the vertical ribs 19 have a width that is thinner than the maximum width of the mounting pins 30. The relatively thin vertical ribs 19 maximize the throughput of the sieve bed by reducing the resistance to flow, i.e., the ribs 19 do not block the flow of particulate materials through the sieve elements 40 of the sieve bed. The ribs 19 are typically arranged in a side by side arrangement over a sub-frame to form the support frame 1 to which the sieve elements 40 are secured. Though the ribs 19 are thin, their depth may be varied to increase or decrease the maximum load capacities of the sifting machine. The vertical ribs 19 are preferably installed so that their upper edges are coplanar with each other. This ensures that the upper surface of the sieve elements 40 will be substantially flat. In addition, the top edges of the vertical ribs are preferably flat and perpendicular to the sides of the rib 19 to properly position the mounting pins 30 thereon.

The vertical ribs 19 are preferably welded to the sub-frame to form the support frame 1, but may also be bolted, screwed, or otherwise secured to the sub-frame of the sieve bed. The mounting pins 30 are secured to the upper edge of the vertical ribs 19 at between 5" and 14" on center. In practice, the vertical ribs 19 may be installed on a sub-frame to form the support frame 1 before the mounting pins 30 are secured to the ribs 19. However, it is preferred to secure the mounting pins 30 to the vertical ribs 19 before the vertical ribs 19 are installed on the sub-frame to form the support frame 1. If one or more of the mounting pins 30 should become worn or damaged, these mounting pins 30 may be individually cut off and replaced, or the entire section of vertical rib 19 having the damaged mounting pins 30 thereon may be removed and replaced with another section of vertical rib 19 and mounting pins 30. The vertical rib 19 with the damaged mounting pins 30 may then be repaired at leisure without incurring large amounts of downtime for the sifting operation.

Figure 13:
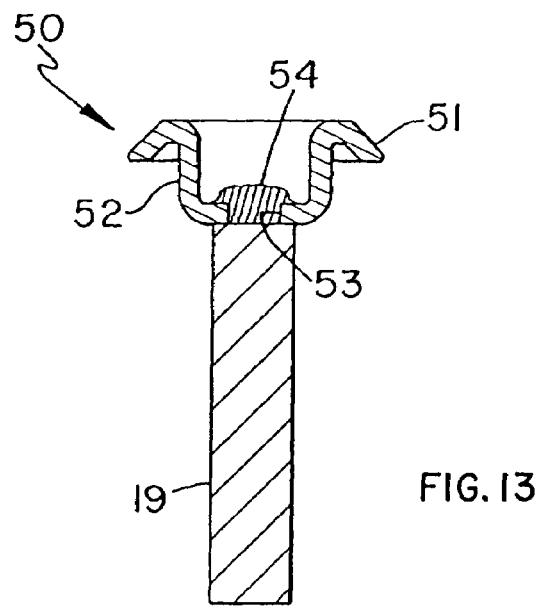
FIG. 13 an embodiment of a mounting pin formed by stamping secured to the upper surface of a vertical rib of a support frame; and, FIG. 14 shows the mounting pin of FIG. 13 and the method whereby this mounting pin secures a pair of sieve elements to a support frame.

FIG. 13 illustrates adjacent and abutting sieve elements 40A and 40B held in place over the support frame 1 by a mounting pin 30 that is secured to a vertical rib 19 of support frame 1. The sieve elements 40A and 40B are provided on their abutting edges with corresponding recesses 41A and 41B which work together to form a receptacle 41 having a shape that is complimentary to the shape of the head 31 of the mounting pin 30. As can be readily understood, the head 31 of the mounting pin 30 is received in the receptacle 41 formed between the sieve elements 40A and 40B in an interlocking manner. The height of the receptacle 41 is to be no greater than the height of the head 31 of the mounting pin 30. Matching the heights of the receptacle 41 to the height of the head 31 of the mounting pin 30 results in a tight engagement between the receptacle 41 and the head of the mounting pin 30. Preferably, the height of the receptacle 41 will be slightly smaller than that of the head 31 so as to create what can be described as a press-fit between the head of the mounting pin 30 and the receptacle 41.

Like the receptacle 11 illustrated in FIG. 1, receptacle 41 is closed off at its top and has an entrance or opening at its bottom so that the head 31 of the mounting pin 30 may be inserted into the receptacle 41. It should be noted that the diameter of the opening of the receptacle 41 is smaller than that of the head 31. This smaller opening is formed by a circumferential bead 42 that consists of two bead sections 42a and 42b that project inwardly from the wall of the receptacle 41. The bead 42 of the receptacle 41 closely engages the undersurface 31B of the head 31 to hold the sieve elements 40A and 40B in place upon the support frame 1. In inserting the head 31 of the mounting pin 30 into the receptacle 40, the frustoconical upper surface 31A of the mounting pin 30 will deflect the bead 42, thereby allowing the head 31 of the pin 30 to enter. Increasing the angle of the upper surface 31A eases the entry of the head 31 into the receptacle 42 and conversely, flattening the angle of surface 31A tends to make the insertion more difficult. Similarly, angling the undersurface 31B of the head 31 upward will present a frustoconical surface to the entrance of the receptacle 41 and will ease the egress of the head 31 from the receptacle 41. However, it is preferred to form the undersurface 31B perpendicular to the axis of symmetry 31E of the mounting pin 30 so as to increase the magnitude of the force required to remove the head 31 of the mounting pin from the receptacle 41. In addition, it may be desirable to form cylindrical section 31C so that it runs parallel to the axis of symmetry 31E. The resulting relatively sharp edge between the undersurface 31B of the head 31 and section 31C would also increase the magnitude of force required to remove the sieve elements 41 from the mounting pins 30.

The sieve elements 40A and 40B are assembled by laying them with their respective edges abutting each other above the support frame 1 in such way that the recesses 41A and 41B come to lie above the heads 31 of the previously installed mounting pins 30. The sieve elements 40A and 40B are then fixed in place by forcing them down on to the mounting pins 30 as by striking them with a hammer. As a result, the material of which the sieve elements 40A and 40B are made to elastically deform to allow the heads 31 of the mounting pins 30 to enter the receptacles 41 which snap in place below the beveled undersurface 31B of the mounting pins 30. For disassembly, a suitable tool is inserted into the joint between the two abutting sieve elements 40A, 40B, and with the help of this tool, the sieve elements 40A, 40B are then pried off the mounting heads 31 of the pins 30 under the elastic deformation of the material of the sieve elements 40A, 40B.

Because the diameters of the mounting pins 30 are relatively small, very little useful area is lost. The only useful area that is lost is due to the lands 44 that define the upper surface of the portion of the sieve element 40 where the receptacle 41 is located in the sieve element. See FIG. 3. Specifically, the diameter of the receptacle half 41a or 41b expressed on the upper surface of the sieve element 40 as lands 44 are at most twice the diameter of the head 31 of the mounting pin 30 received within the receptacle 41. The small amount of lost surface area 44 results in the maximum amount of useful area for the sifting machine and hence, the maximum throughput for particulate materials. Another benefit to the small amount of lost surface area is that it is possible to utilize more mounting pins 30 in a given application, without needlessly sacrificing useful area. In a rigorous setting more mounting pins 30 may be used to secure the sieve elements 40 to the support frame 1, thereby decreasing the likelihood that a sieve element 40 may become dislodged during use. Conversely, because of the high forces necessary to dislodge the sieve elements 40 from the mounting pins 30, and because the mounting pins 30 incur very little lost surface area, a sifting machine may be designed that maximizes both throughput of particulate materials and the weight capacity of the sifting machine without having to sacrifice the former for the latter.

To increase the useful life of the sieve elements 40 and mounting pins 30, it is also desirable to form a seal or lip 46 around the periphery of each sieve element 40 as illustrated in FIG. 13. The respective seals 46 on abutting sieve elements 40 form a barrier to particulate materials and fines that might otherwise insinuate themselves into the joint between the respective panels or into the receptacles 41 in which the heads 31 of the mounting pins 30 are received. When particulates or fines fill the joints between the panels or infiltrate the receptacles 41, the mounting pins' ability to secure the sieve panels 40 to the support frame 1 may be compromised, thereby resulting in the inadvertent dislodgement of a sieve panel. While this cannot, in all instances be prevented, by including a seal 46 at the edge of the panels, the likelihood of inadvertent dislodgement of a sieve panel can be greatly reduced.

Yet another embodiment of a mounting pin constructed and arranged according to the principles of the present invention is illustrated in FIG. 13. Mounting pin 50 shown in FIG. 13 is similar to mounting pin 30 illustrated in FIG. 11. Mounting pin 50 omits the stem 32 of the mounting pin 30 and the lower beveled surface 31B of the head 31 of mounting pin 30. Preferably, the mounting pin 50 is fabricated from steel using a stamping process. Mounting pin 50 has an upper frustoconical surface 51, which extends downwardly from a cylindrical body 52 at an angle of approximately 45°. A cylindrical bore or hole 53 is formed through the bottom of the cylindrical body 52. The mounting pin 50 is secured to the support structure 1 using well-known plug welding techniques. As can be seen in FIG. 13, a mounting pin 50 is placed in a predetermined position and attitude in contact with the upper surface of the vertical member 19 of the support frame 1. A weld material 54 suitable for use with the material from which the mounting pin 50 fabricated is heated to melting and inserted into the hole 53. The molten weld material 54 fuses the mounting pin 50 to the upper surface of the vertical web 19 of the support frame 1.

Figure 12:
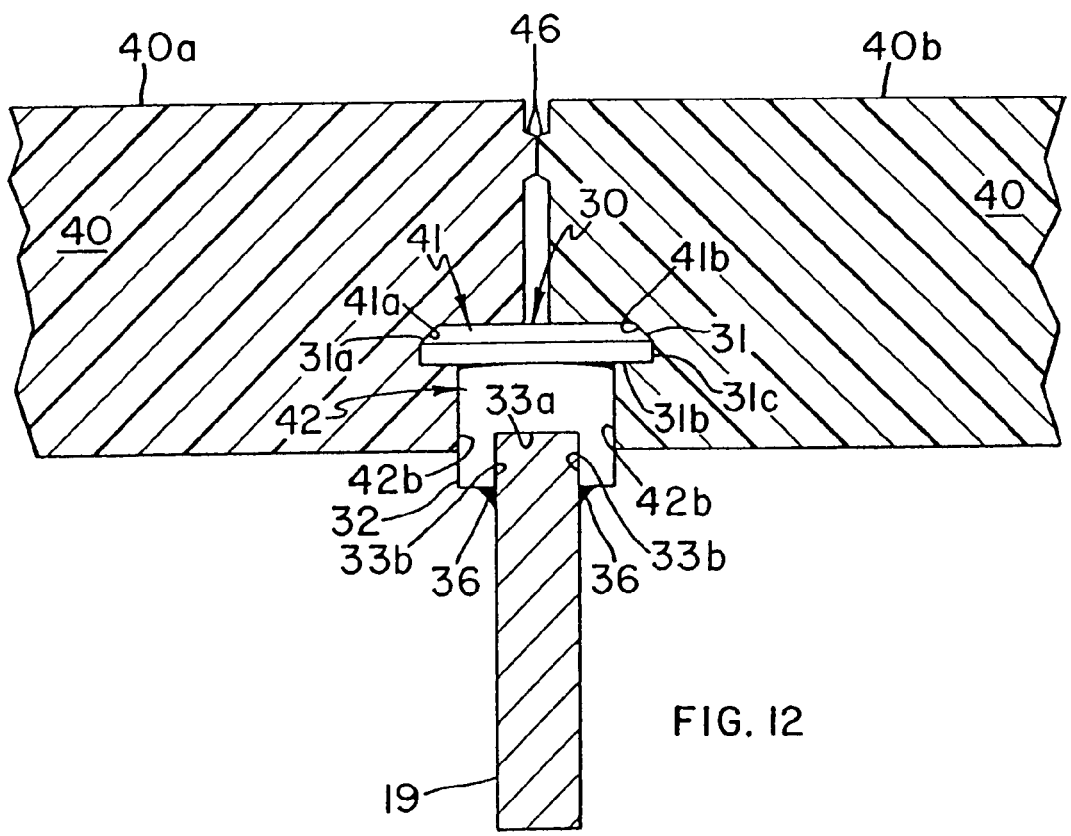
FIG. 12 shows the mounting pin of FIG. 11 and the method whereby this mounting pin secures a pair of sieve elements to a support frame.
Figure 14:
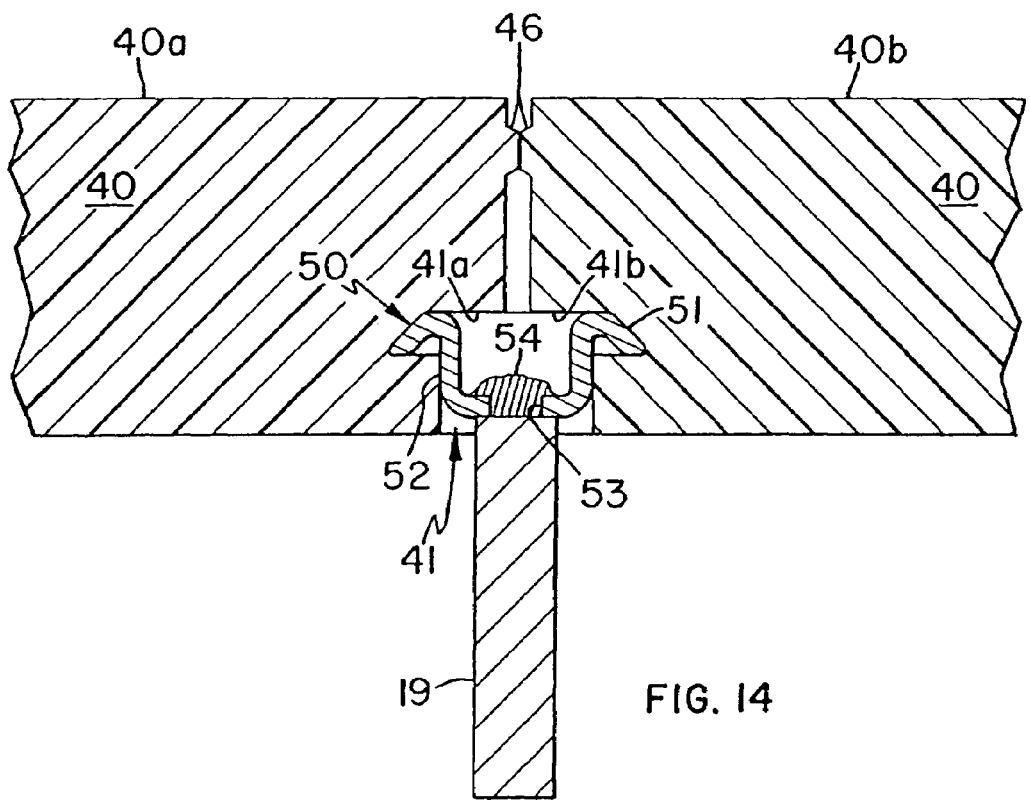

Given the similarity in the profiles of the heads of the respective mounting pins 30 and 50, it is possible to utilize sieve elements 40A and 40B having recesses 41A and 41B as illustrated in FIG. 12 with both mounting pins 30 and 50. See FIG. 14. Alternatively, sieve elements having recesses that correspond more closely to the profile of the mounting pin 50 may be provided. The sieve elements used in conjunction with mounting pin 50 are secured to and removed from the mounting pin 50 in the same manner as described above in connection with mounting pin 30.

The invention described above may be embodied in other forms without departing from the spirit or essential characteristics thereof. The embodiments disclosed in this application are to be considered in all respects as illustrative and not restrictive. The scope of the invention is indicated by the appended claims rather than by the foregoing description and all changes, which come within the meaning and range of equivalency of the claims, are intended to be embraced therein.

What is claimed is:

1. A generally cylindrical mounting pin for securing a sieve element to a support frame comprising:

a generally cylindrical head having an upper surface intersecting with an under surface at an outer edge spaced away from an axis of symmetry of the head, the upper surface generally tapering substantially continuously from the outer edge towards the axis of symmetry, the under surface forming a first angle from the axis of symmetry that is greater than a second angle formed from the upper surface to the axis of symmetry; and a stem having a narrower cross-section than the head, the stem being adjacent to the under surface of the head and extending away from the head to a distal end, the distal end having a mounting mechanism configured to attach to the support frame.

2. The mounting pin of claim 1 wherein a difference between the first angle of the under surface and the second angle of the upper surface is great enough that an insertion force needed to insert the mounting pin into a receptacle formed between sieve elements is lower than a removal force needed to remove the mounting pin from the receptacle.

3. The mounting pin of claim 1 wherein the head comprises a flat top adjacent to the upper surface of the head, the top extending towards the axis of symmetry and spaced apart from the stem so that the head defines a frustoconical shape.

4. The mounting pin of claim 1 wherein the head comprises a rounded top adjacent to the upper surface of the head, the top extending towards the axis of symmetry and spaced apart from the stem.

5. The mounting pin of claim 1 wherein the upper surface comprises a rounded shape extending towards the axis of symmetry and spaced apart from the stem.

6. The mounting pin of claim 1 wherein the upper surface of the head extends towards the axis of symmetry and spaced apart from the stem so that the head defines a conical shape.

7. The mounting pin of claim 1 wherein the mounting mechanism of distal end of the stem comprises a slot sized to receive a portion of the support frame.

8. The mounting pin of claim 1 wherein the mounting mechanism of distal end of the stem is configured such that the mounting pin can be bolted to a portion of the support frame.

9. The mounting pin of claim 1 wherein the cross-section of the stem is wider than a width of a portion of the support frame that the mounting pin is configured to be attached.

10. The mounting pin of claim 1 wherein the cross-section of the stem is narrower than a width of a portion of the support frame that the mounting pin is configured to be attached.

11. The mounting pin of claim 1 wherein the head and stem are formed from a unitary structure.

12. The mounting pin of claim 1 wherein the head and stem are formed from different materials.

13. The mounting pin of claim 1 wherein the head comprises an abrasion resisting material.

14. The mounting pin of claim 1 wherein the head comprises a composite of materials.

15. The mounting pin of claim 1 wherein at least one of the head and stem comprises steel.

16. The mounting pin of claim 1 wherein at least one of the head and stem comprises polyurethane.

17. The mounting pin of claim 1 wherein at least one of the head and stem comprises ceramic.

18. The mounting pin of claim 1 wherein at least one of the head and stem comprises plastic.

19. The mounting pin of claim 1 wherein the first angle formed between the under surface and the axis of symmetry is between 85 and 95 degrees.

20. The mounting pin of claim 1 wherein the under surface is substantially perpendicular to the axis of symmetry.

21. The mounting pin of claim 1 wherein the second angle formed between the upper surface and the axis of symmetry is between 45 and 60 degrees.

22. The mounting pin of claim 1 wherein the outer edge formed by the intersection of the upper surface and the under surface is relatively sharp.

23. The mounting pin of claim 1 wherein the outer edge formed by the intersection of the upper surface and the under surface includes a cylindrical section interposed between the surfaces.

24. The mounting pin of claim 1 wherein the outer edge formed by the intersection of the upper surface and the under surface includes a radius section forming a gentle transition between the surfaces.

25. A support frame having a plurality of the mounting pins of claim 1 mounted thereto, the support frame comprising a plurality of elongate thin ribs having upper edges arranged in a substantially coplanar relationship, the plurality of mounting pins being secured to the upper edge of the ribs.

26. A sieve bed comprising a first and a second sieve element with edges arranged in abutting juxtaposition and having a plurality of the mounting pins of claim 1 attached thereto, the juxtaposed edges of the sieve elements having recesses formed therein and arranged such that a pair of adjacent recesses work together to form a receptacle complementary to the shape of the mounting pin head, the sieve elements being configured to be secured to the support frame by engaging one of the plurality of mounting pins in the receptacle.

27. A support frame for a sieve bed comprising:

a plurality of elongate thin ribs having upper edges arranged in a substantially coplanar relationship; and a plurality of mounting pins, each generally cylindrical mounting pin comprising a generally cylindrical head having an upper surface intersecting with an under surface at an outer edge spaced away from an axis of symmetry of the head, the upper surface generally tapering substantially continuously from the outer edge towards the axis of symmetry, the under surface forming a first angle from the axis of symmetry that is greater than a second angle formed from the upper surface to the axis of symmetry, each mounting pin further comprising a stem having a narrower cross-section than the head, the stem being adjacent to the under surface of the head and extending away from the head to a distal end, the distal end having a mounting mechanism configured to attach to one of the plurality of elongate thin ribs.

28. A sifting machine comprising:

a subframe;

a support frame that rests on and is secured to the subframe, the support from comprising a plurality of elongate thin ribs having upper edges arranged in a substantially coplanar relationship; and a plurality of mounting pins, each generally cylindrical mounting pin comprising a generally cylindrical head having an upper surface intersecting with an under surface at an outer edge spaced away from an axis of symmetry of the head, the upper surface generally tapering substantially continuously from the outer edge towards the axis of symmetry, the under surface forming a first angle from the axis of symmetry that is greater than a second angle formed from the upper surface to the axis of symmetry, each mounting pin further comprising a stem having a narrower cross-section than the head, the stem being adjacent to the under surface of the head and extending away from the head to a distal end, the distal end having a mounting mechanism configured to attach to one of the plurality of elongate thin ribs; and a first and a second sieve element with edges arranged in abutting juxtaposition, the juxtaposed edges having recesses formed therein and arranged such that a pair of adjacent recesses work together to form a receptacle complementary to the shape of one of the plurality of mounting pin heads, the sieve elements being secured to the support frame by engaging one of the plurality of mounting pins in the receptacle.

* * * * *